United States Patent [19]

Penney et al.

[11] Patent Number: 4,598,315
[45] Date of Patent: Jul. 1, 1986

[54] SIGNAL PROCESSING APPARATUS AND METHOD OF OPERATING SUCH APPARATUS

[75] Inventors: Bruce J. Penney; Michael D. Nakamura, both of Portland, Oreg.

[73] Assignee: Tektronix, Inc., Beaverton, Oreg.

[21] Appl. No.: 476,182

[22] Filed: Mar. 17, 1983

[51] Int. Cl.[4] .............................................. H04N 5/04
[52] U.S. Cl. .................................... 358/149; 358/10; 358/139; 358/148
[58] Field of Search ................... 358/10, 21 R, 12, 19, 358/139, 141–149, 160, 185, 186, 188, 181; 328/152, 153, 147, 148, 163; 340/825.03, 825.06, 825.1, 825.11, 825.14, 825.17; 455/3, 5, 9, 131, 115, 271, 287, 67, 8, 291; 381/25, 56, 58, 80, 81, 123, 10, 11, 12; 307/241, 242, 243; 370/13, 14, 16; 375/102; 371/68; 315/9, 129, 132; 367/13

[56] References Cited

U.S. PATENT DOCUMENTS 3,098,975  7/1963  Schneiderman .................... 455/227

OTHER PUBLICATIONS

Pioneer Stereo Receiver SX-3900 operating instructions by Pioneer Electronic Corporation.

Pioneer Stereo Cassette Tape Deck CT-8R, Jun. 1981, operating instructions.

Primary Examiner—James J. Groody
Assistant Examiner—Michael D. Parker
Attorney, Agent, or Firm—John Smith-Hill; Francis I. Gray

[57] ABSTRACT

A signal processing apparatus comprises first and second switches connected respectively to an input terminal and an output terminal of the apparatus and defines first and second signal channels extending in parallel from the first switch to the second switch. The first and second switches are operable to connect a selected one of the signal channels between the input terminal and the output terminal. The first signal channel includes a signal processor, such as a frame synchronizer. The input terminal is connected to the signal processor even when the second channel is selected for connecting the input terminal to the output terminal so that a signal applied to the input terminal is applied to the signal processor as well as to the output terminal when the second channel is selected. Thus, the signal processor can be exercised and the output of the signal processor can be monitored while the second channel is utilized for transmitting a signal from the input terminal to the output terminal.

6 Claims, 1 Drawing Figure

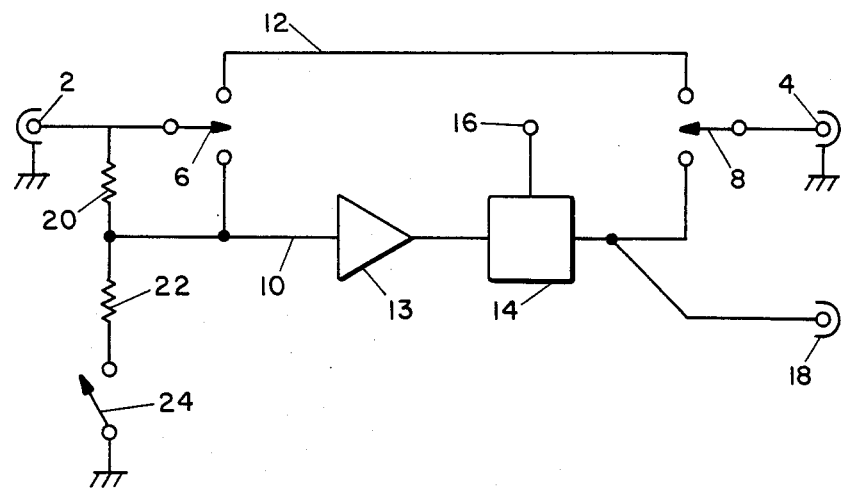

SIGNAL PROCESSING APPARATUS AND METHOD OF OPERATING SUCH APPARATUS

This invention relates to a method of operating a signal processing apparatus, and to a signal processing apparatus adapted to be operated in accordance with that method.

BACKGROUND OF THE INVENTION

It is frequently desired to process an input video signal at a time when the continued presence of the video signal is critical, e.g., when the signal is being broadcast or otherwise transmitted to television receivers. This processing may involve use of, for example, a frame synchronizer, a processing amplifier or a video corrector. Conventionally, the processing device is incorporated in an apparatus having two signal channels between its input terminal and its primary, or program, output terminal, namely a processing channel, in which the processing is effected, and a bypass channel, whereby the input video signal is passed to the program output without modification. The processing channel includes the processing device itself. If the processing device is not functioning correctly at the time of a switch from the bypass channel to the processing channel, the output signal from the processing apparatus may be garbled, and accordingly the television picture may be momentarily degraded. In the case where the processing device is a frame synchronizer including a phase lock system for locking to the burst and sync information of the input video signal, the degradation of the picture may be alleviated, or the period of degradation reduced, by using a phase lock system having a short response time. However, the lock-up time cannot be reduced arbitrarily without regard for the operation of the system under normal conditions.

It is known to connect a high impedance tap to a video signal channel to enable the signal to be monitored without disturbing the signal passed by the channel. This so-called loop-through arrangement is not used with a processing apparatus that has both an operating channel and a bypass channel.

SUMMARY OF THE INVENTION

According to a first aspect of the present invention there is provided a method of operating a signal processing apparatus having an input terminal and an output terminal and defining at least two separately selectable signal channels from said input terminal to said output terminal, one of said channels including means for processing a signal applied to said input terminal prior to transmitting the signal to said output terminal, when said one channel is selected, and said method comprising applying the signal to the signal processing means and monitoring the output of the signal processing means when a channel other than said one channel is selected for transmitting the signal to the output terminal.

According to a second aspect of the present invention there is provided signal processing apparatus comprising an input terminal to which a signal may be applied, first switch means connected to said input terminal, second switch means, an output terminal connected to said second switch means, and means defining at least first and second signal channels extending in parallel from said first switch means to said second switch means, said first and second switch means being operable to connect a selected one of said signal channels between the input terminal and the output terminal, said first signal channel including signal processing means and the apparatus further comprising means for connecting the input terminal to the signal processing means even when a channel other than said first channel is selected for connecting the input terminal to the output terminal so that a signal applied to the input terminal is applied to the signal processing means as well as to the output terminal when said other channel is selected, whereby the signal processing means can be exercised and the output of the signal processing means can be monitored while said other channel other than the first channel is utilized for transmitting a signal from the input terminal to the output terminal.

BRIEF DESCRIPTION OF THE DRAWING

For a better understanding of the invention, and to show how same may be carried into effect, reference will now be made, by way of example, to the accompanying drawing, the single FIGURE of which illustrates in diagrammatic form a frame synchronizing apparatus in accordance with the invention.

DETAILED DESCRIPTION OF THE PREFERRED EMBODIMENT

The illustrated frame synchronizing apparatus has an input terminal 2 and a primary, or program, output terminal 4. The terminals 2 and 4 are connected to respective switches 6 and 8. Two signal transmission channels are connected between the switches 6 and 8, and the switches are operable to select either one of the channels for transmitting the video signal received at the input terminal 2 to the output terminal 4. The two channels are a synchronization channel 10 and a direct or bypass channel 12. The synchronization channel 10 includes an input buffer amplifier 13 and a frame synchronizer 14. The frame synchronizer 14 is used to synchronize the input video signal received at the terminal 2 with a reference video signal received at a terminal 16. The output of the frame synchronizer is connected not only to the switch 8 but also to a secondary, or monitor, output terminal 18.

The frame synchronizer may be of conventional form, comprising an A-to-D converter for converting the input analog signal into digital form, a digital store, write and read circuits for writing the digital signal into the store and reading the digital signal out of the store, a D-to-A converter for converting the digital signal read out of the store into analog form, and input and reference timing circuits for controlling the timing for D-to-A and A-to-D conversion and for controlling the writing and reading operations. The input and reference timing circuits include respective phase lock systems for generating pulses which are synchronized with the color burst components of the input video signal and the reference video signal respectively and with the horizontal and vertical synchronizing information of the input and reference signals.

The switches 6 and 8 are ganged, so that they select either the synchronization channel 10 or the bypass channel 12 for connection between the terminals 2 and 4. It will be appreciated that when the switches 6 and 8 are used to select the synchronization channel 10, the connection between the input terminal 2 and the amplifier 13 is a low impedance connection. Connected in parallel with the switch 6 between the input terminal 2 and the buffer amplifier 13 is a high impedance connection which is shown schematically as a resistor 20. The resistor 20 insures that even when the switches 6 and 8 select the bypass channel 12, the input video signal is still applied to the buffer amplifier 13. This insures that the frame synchronizer is exercised continuously, so that the phase lock system of the input timing circuit remains locked at all times to the color burst component and the horizontal and vertical sync information of the input video signal and the output video signal of the frame synchronizer remains synchronized at all times with the color burst component and the horizontal and vertical sync information of the reference video signal, and also permits the signal that would be applied to the terminal 4 if the synchronization channel 10 were selected by the switches 6 and 8 to be monitored continuously by way of the secondary output terminal 18. This insures that a technician can verify that the video signal provided by the synchronization channel 10 is of satisfactory quality before changing the switches 6 and 8 over from the bypass channel 12 to the synchronization channel 10.

The resistor 20 has a relatively high resistance value, typically of the order of 10 to 20 kΩ, in order to ensure that when the bypass channel 12 is selected the impedance of the connection between the terminals 2 and 4 is not disturbed by the fact that the terminal 2 in fact remains connected to the amplifier 13. The amplifier 13 has a finite input capacitance which, in combination with the high resistance value of the resistor 20, causes high frequency components of the input signal received at the input of the amplifier 13 to be attenuated by the resistor 20 and amplifier 13 combination when the bypass channel 12 is selected. The buffer amplifier 13 includes compensating circuitry (not shown) which is switched into the signal path when the channel 12 is selected but is switched out when the channel 10 is selected, since the switch 6 then short circuits the resistor 20.

It will be noted that a resistor 22 and switch 24 are connected in series between the input of the frame synchronizer 14 and ground. The switch 24 is closed to provide the proper low impedance, e.g., 75Ω, termination at the input to the frame synchronizer when the synchronization channel 10 is selected by the switches 6 and 8, and is opened when the channel 12 is selected.

It will be appreciated that the invention is not restricted to the particular signal processing apparatus that has been shown and described, since variations may be made therein without departing from the scope of the invention as defined in the appended claims, and equivalents thereof. For example it is not necessary that the processing means be a frame synchronizer, since the invention may be used with other devices such as a proc amplifier or a video corrector.

We claim:

1. A method of operating a signal processing apparatus having an input terminal and an output terminal and defining at least two separately selectable signal channels from said input terminal to said output terminal, one of said channels including means for processing a signal applied to said input terminal prior to transmitting the processed signal to said output terminal A when said one channel is selected, and said method comprising applying the signal to the signal processing means and monitoring the output of the signal processing means at an auxiliary output terminal when a channel other than said one channel is selected for transmitting the signal to the output terminal.

2. Signal processing apparatus comprising an input terminal to which a signal may be applied, first switch means connected to said input terminal, second switch means, an output terminal connected to said second switch means, and means defining at least first and second signal channels extending in parallel from said first switch means to said second switch means, said first and second switch means being operable to connect a selected one of said signal channels between the input terminal and the output terminal, only said first signal channel including signal processing means and having an auxiliary output terminal, and the apparatus further comprising means for connecting the input terminal to the signal processing means even when said second channel is selected for connecting the input terminal to the output terminal so that a signal applied to the input terminal is applied to the signal processing means as well as to the output terminal when said second channel is selected, whereby the signal processing means can be exercised and the output of the signal processing means can be monitored at said auxiliary output terminal while said second channel is utilized for transmitting a signal from the input terminal to the output terminal.

3. Signal processing apparatus according to claim 2, wherein said means for connecting the input terminal to the signal processing means comprise a high impedance connection.

4. Signal processing apparatus according to claim 3, wherein said signal processing means have a finite input capacitance, and include means for compensating for high frequency distortion of the output of the signal processing means when said second channel is utilized for transmitting a signal from the input terminal to the output terminal.

5. Signal processing apparatus according to claim 4, wherein the signal processing means comprise a signal processing device and an input amplifier therefor.

6. Apparatus according to claim 2, comprising a resistor and a switch connected in series between the input of the signal processing means and a reference potential level, whereby the switch can be closed when said first channel is selected so as to provide a low input impedance termination for the signal processing means.

* * * * *